(12) United States Patent
Watson

(10) Patent No.: US 8,136,826 B2
(45) Date of Patent: Mar. 20, 2012

(54) POWER RETRACTABLE ROCKER BOARD

(75) Inventor: Bradley E. Watson, Barrie (CA)

(73) Assignee: Magna International Inc., Aurora (CA)

( * ) Notice: Subject to any disclaimer, the term of this patent is extended or adjusted under 35 U.S.C. 154(b) by 420 days.

(21) Appl. No.: 12/518,555

(22) PCT Filed: Dec. 13, 2007

(86) PCT No.: PCT/CA2007/002290
§ 371 (c)(1),
(2), (4) Date: Jun. 10, 2009

(87) PCT Pub. No.: WO2008/071003
PCT Pub. Date: Jun. 19, 2008

(65) Prior Publication Data
US 2010/0044993 A1  Feb. 25, 2010

(51) Int. Cl.
*B60R 3/02* (2006.01)
*B60R 3/00* (2006.01)

(52) U.S. Cl. .......................... 280/166; 280/163
(58) Field of Classification Search .................. 280/163, 280/164.1, 165, 166, 169; 180/90.6
See application file for complete search history.

(56) References Cited

U.S. PATENT DOCUMENTS

| | | | |
|---|---|---|---|
| 3,528,574 A * | 9/1970 | Denner et al. ................ 414/558 |
| 3,762,742 A * | 10/1973 | Bucklen ......................... 280/166 |
| 4,231,583 A * | 11/1980 | Learn ............................. 280/166 |
| 5,085,450 A * | 2/1992 | DeHart, Sr. ................... 280/166 |
| 6,178,364 B1 * | 1/2001 | Delurey et al. ................. 701/36 |
| 6,264,222 B1 * | 7/2001 | Johnston et al. .............. 280/166 |
| 6,375,207 B1 * | 4/2002 | Dean et al. ..................... 280/166 |
| 7,017,927 B2 * | 3/2006 | Henderson et al. ........... 280/166 |
| 7,513,520 B2 * | 4/2009 | Okuyama ...................... 280/166 |
| 7,513,565 B2 * | 4/2009 | Watson .......................... 296/199 |
| 7,677,584 B2 * | 3/2010 | Raley et al. .................... 280/166 |
| 7,857,337 B2 * | 12/2010 | Ferguson et al. .............. 280/166 |
| 7,934,736 B2 * | 5/2011 | Kircher .......................... 280/166 |
| 7,971,891 B2 * | 7/2011 | Kircher .......................... 280/163 |
| 7,976,042 B2 * | 7/2011 | Watson et al. ................. 280/166 |
| 2004/0100063 A1 * | 5/2004 | Henderson et al. ........... 280/166 |
| 2005/0035568 A1 * | 2/2005 | Lee et al. ....................... 280/166 |
| 2005/0087951 A1 * | 4/2005 | Leitner et al. ................. 280/166 |
| 2005/0179227 A1 * | 8/2005 | Leitner .......................... 280/163 |
| 2006/0214386 A1 * | 9/2006 | Watson .......................... 280/163 |
| 2006/0255558 A1 * | 11/2006 | Okuyama ...................... 280/166 |
| 2007/0267842 A1 * | 11/2007 | Seibert et al. .................. 280/166 |
| 2008/0157500 A1 * | 7/2008 | Raley et al. .................... 280/166 |
| 2008/0179920 A1 * | 7/2008 | Watson .......................... 296/209 |
| 2009/0189365 A1 * | 7/2009 | Ferguson et al. .............. 280/166 |
| 2010/0044993 A1 * | 2/2010 | Watson .......................... 280/166 |
| 2010/0320715 A1 * | 12/2010 | Watson .......................... 280/166 |

* cited by examiner

*Primary Examiner* — J. Allen Shriver, II
*Assistant Examiner* — Jacob Meyer
(74) *Attorney, Agent, or Firm* — Miller Canfield

(57) ABSTRACT

A running board assembly for a motor vehicle includes an arm adapted to be fixedly coupled to the motor vehicle. A pivot shaft extends through the arm and is rotatable relative thereto. A step is fixedly secured to the pivot shaft and is movable between a stowed position and a deployed position. A motor is operably coupled to the pivot shaft such that actuation of the motor rotates the pivot shaft relative to the arm to move the step between the stowed position and the deployed position.

23 Claims, 11 Drawing Sheets

US 8,136,826 B2

POWER RETRACTABLE ROCKER BOARD

FIELD OF THE INVENTION

The invention relates to running boards for a motor vehicle. More particularly, the invention relates to a power retractable rocker board movable between a stowed position and a deployed position.

BACKGROUND OF THE INVENTION

Retractable running boards or steps are well-known in the art for allowing users to enter and exit a motor vehicle having a high ground clearance. These so-called retractable running boards or steps are generally movable between a retracted position, in which a step is tucked underneath an underbody of the motor vehicle, and an extended position, in which the step is spaced apart from the underbody of the motor vehicle for supporting the user. It is desirable to integrate the retractable running board into the corresponding body portion of the motor vehicle in order to improve the overall styling of the motor vehicle.

SUMMARY OF THE INVENTION

According to one aspect of the invention, a running board assembly for a motor vehicle includes an arm adapted to be fixedly coupled to the motor vehicle. A pivot shaft extends through the arm and is rotatable relative thereto. A step is fixedly secured to the pivot shaft and is movable between a stowed position and a deployed position. A motor is operably coupled to the pivot shaft such that actuation of the motor rotates the pivot shaft relative to the arm to move the step between the stowed position and the deployed position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE PREFERRED EMBODIMENTS

Figure 1:
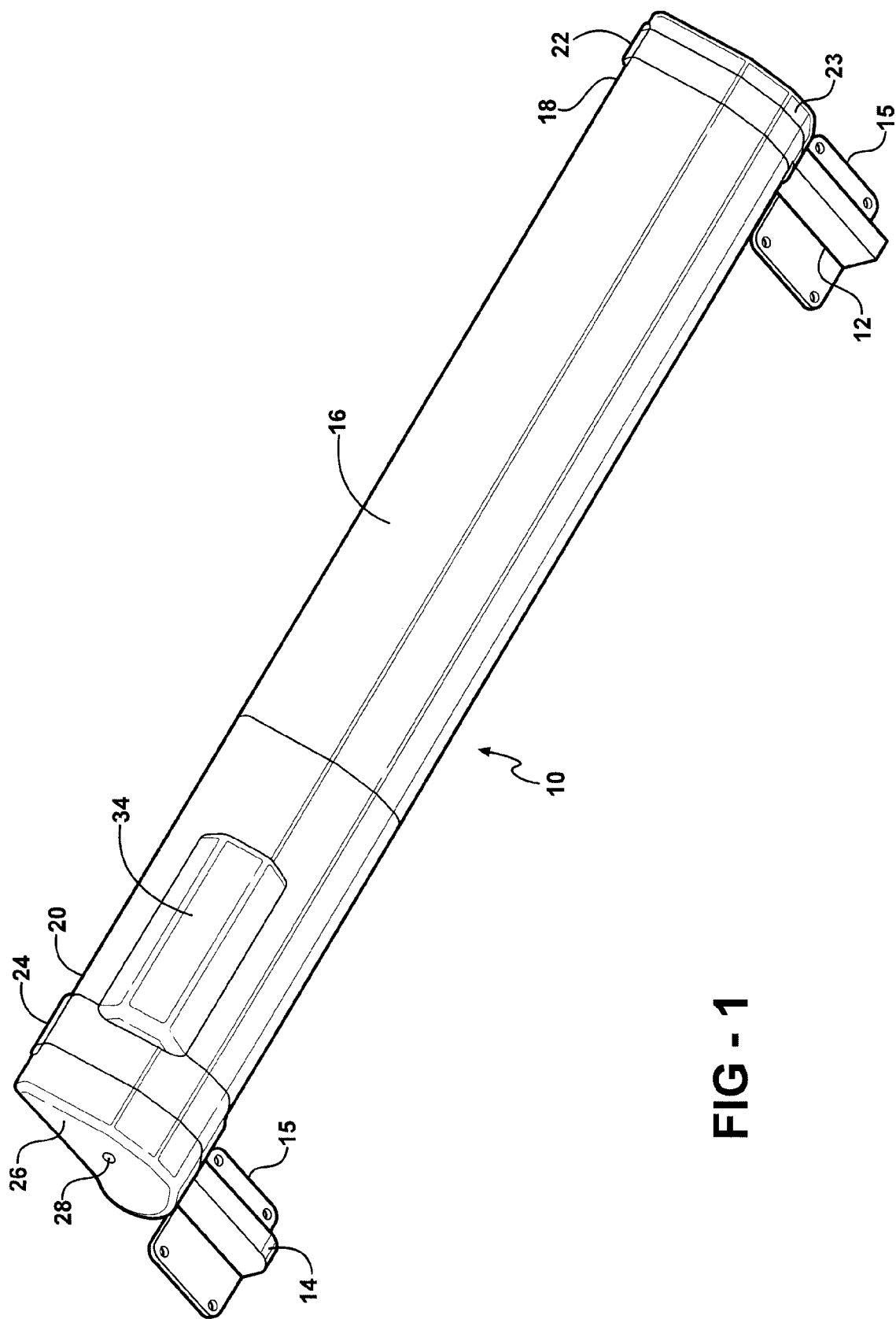
FIG. 1 is a lower, perspective view of a running board assembly according to the invention.
Figure 2:
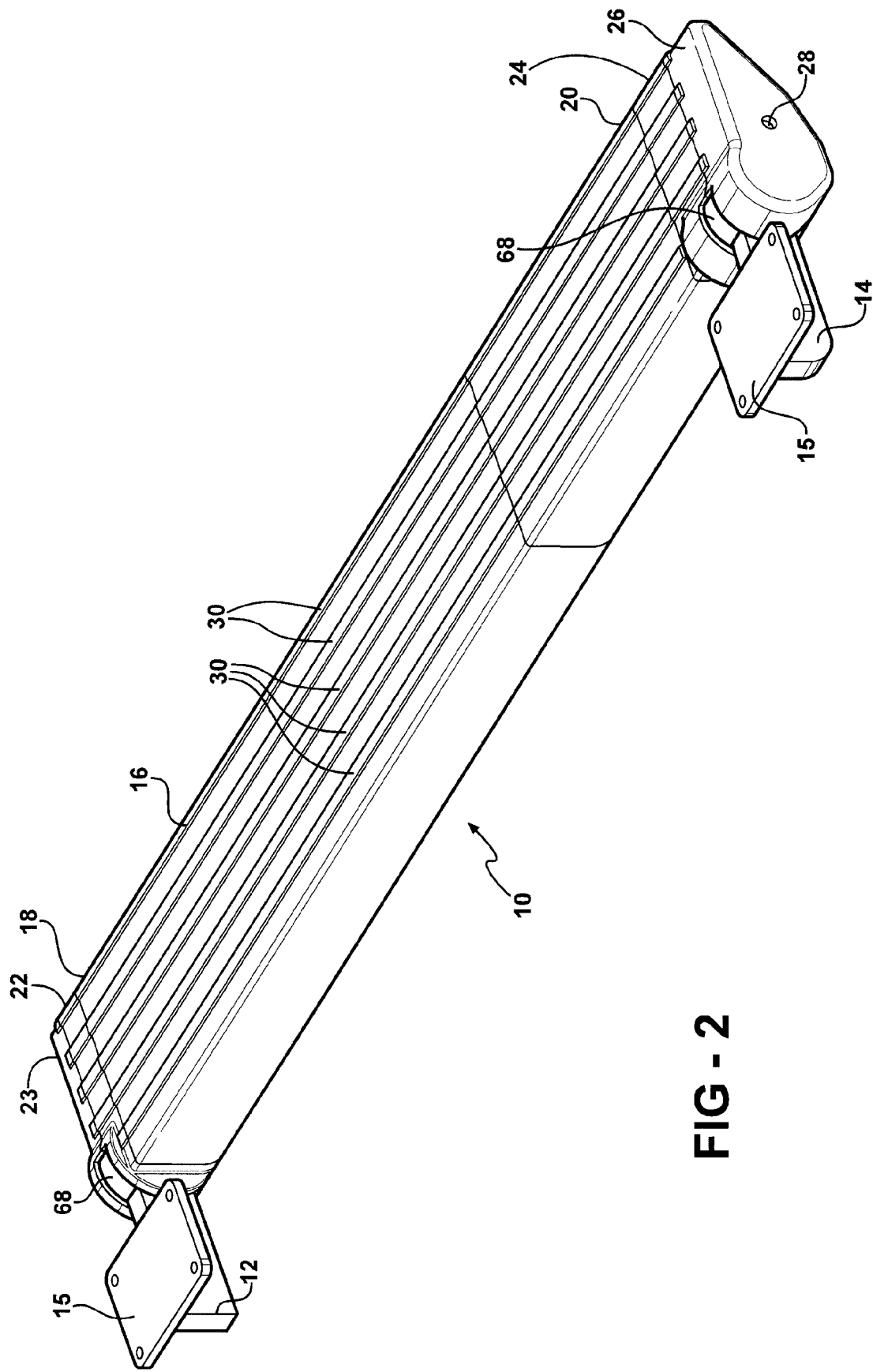
FIG. 2 is an upper, perspective view of the running board assembly including a step in a deployed position.

Referring to FIGS. 1 and 2, a running board assembly, generally shown at 10, includes spaced apart first 12 and second 14 arms. A mounting bracket 15 is connected to each of the first 12 and second 14 arms and is adapted to attach the running board assembly 10 to a motor vehicle. It is appreciated that the particular number of arms and mounting brackets utilized in the running board assembly 10 may vary.

Figure 5:
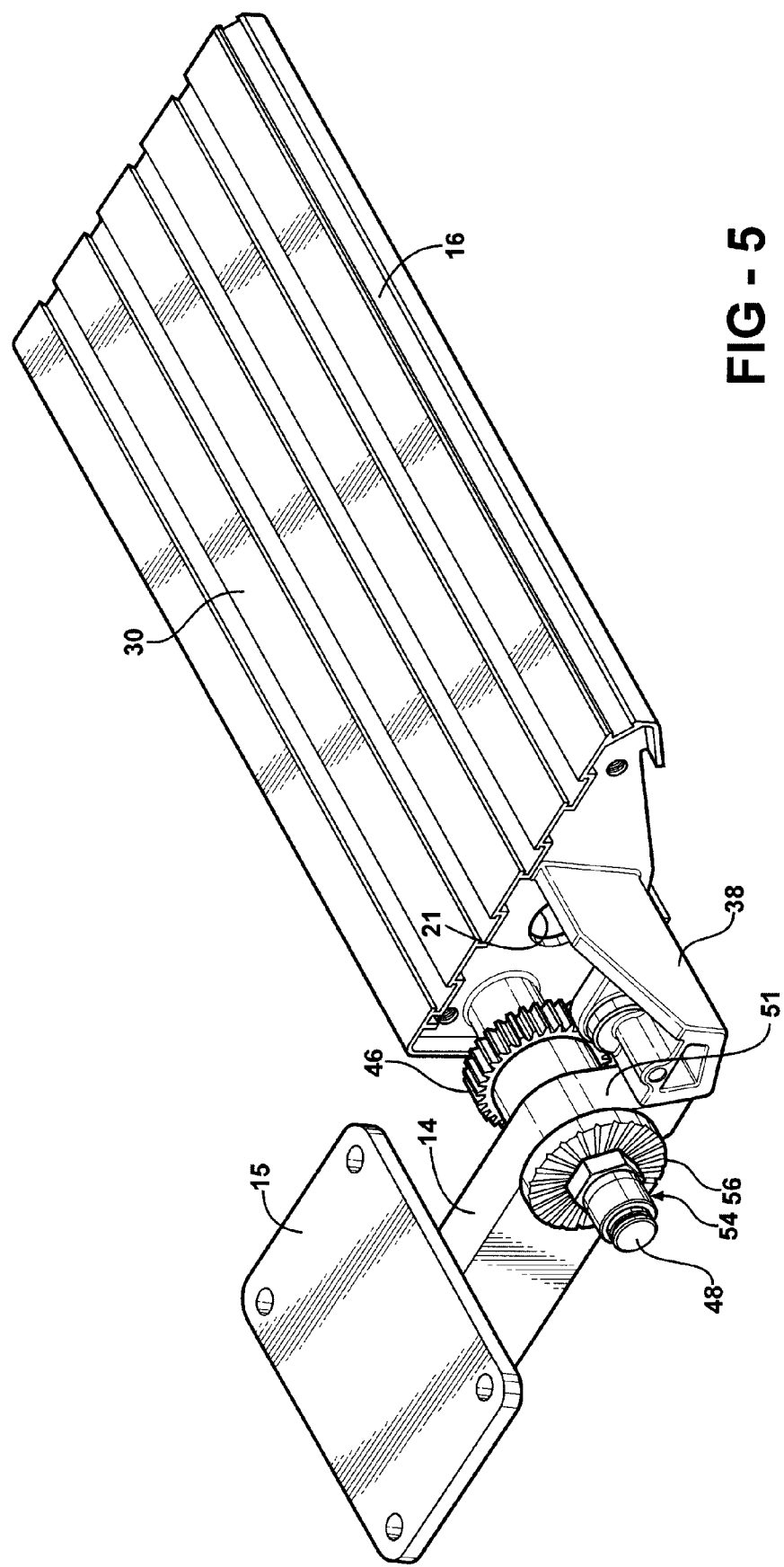
FIG. 5 is a perspective view of the rear end of the step including a portion of the clutch assembly removed.

The running board assembly 10 includes an elongated step, generally indicated at 16, coupled to each of the first 12 and second 14 arms. The step 16 includes a main body portion 17 extending longitudinally between a first end 18 and an opposing second end 20. The step 16 defines an interior portion 21, shown in FIG. 5, extending at least partially between the first 18 and second 20 ends.

The step 16 includes an inner end cap 22 coupled to the first end 18 of the main body portion 17 and an outer end cap 23 coupled to the inner end cap 22 by an end cap screw. The step 16 also includes an inner end cap 24 coupled to the second end 20 of the main body portion 17 and an outer end cap 26 coupled to the inner end cap 24 by an end cap screw 28. A step tread 30 is disposed along a top surface of the step 16. More specifically, the step tread 30 may extend along a top surface of the main body portion 17 and the end caps 22, 23, 24, 26 of the step 16. It is contemplated that a bottom surface of the step 16 may have a Class A finish.

Figure 6:
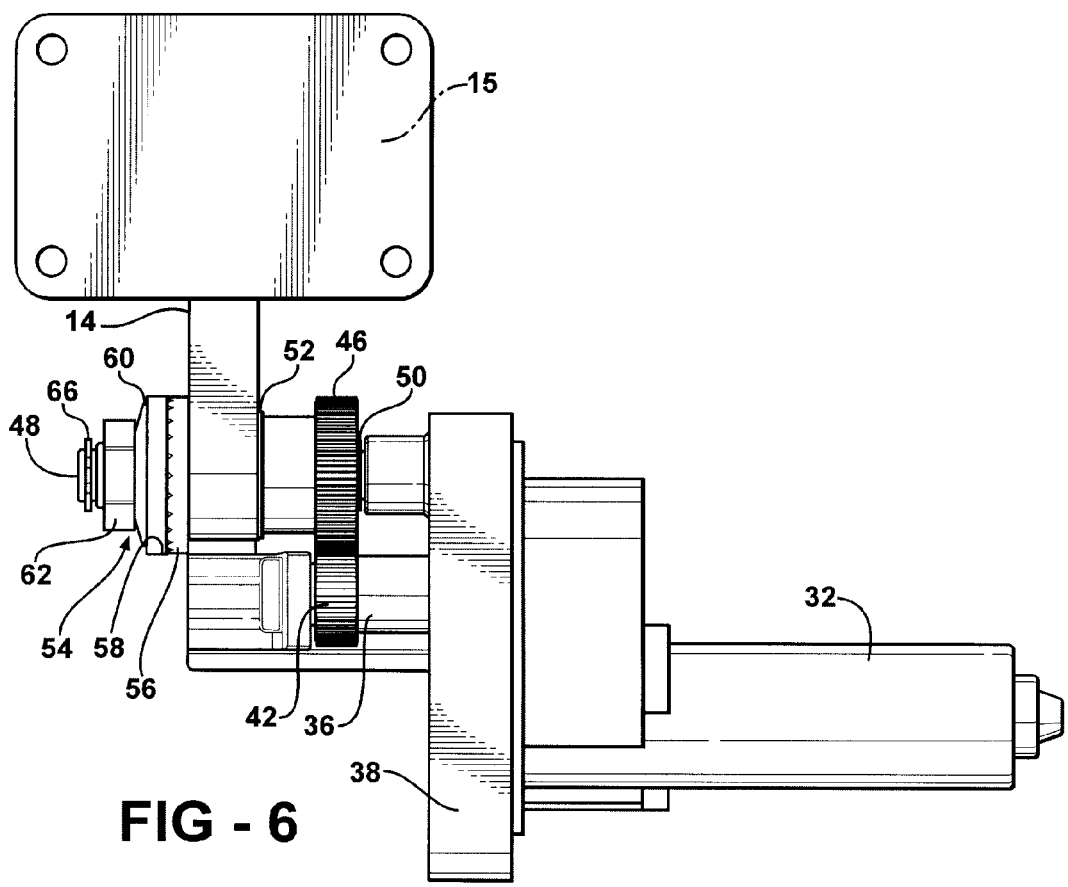
FIG. 6 is a top view of a motor operably coupled to the rear pivot shaft and a rear arm receiving the rear pivot shaft therethrough.
Figure 4:
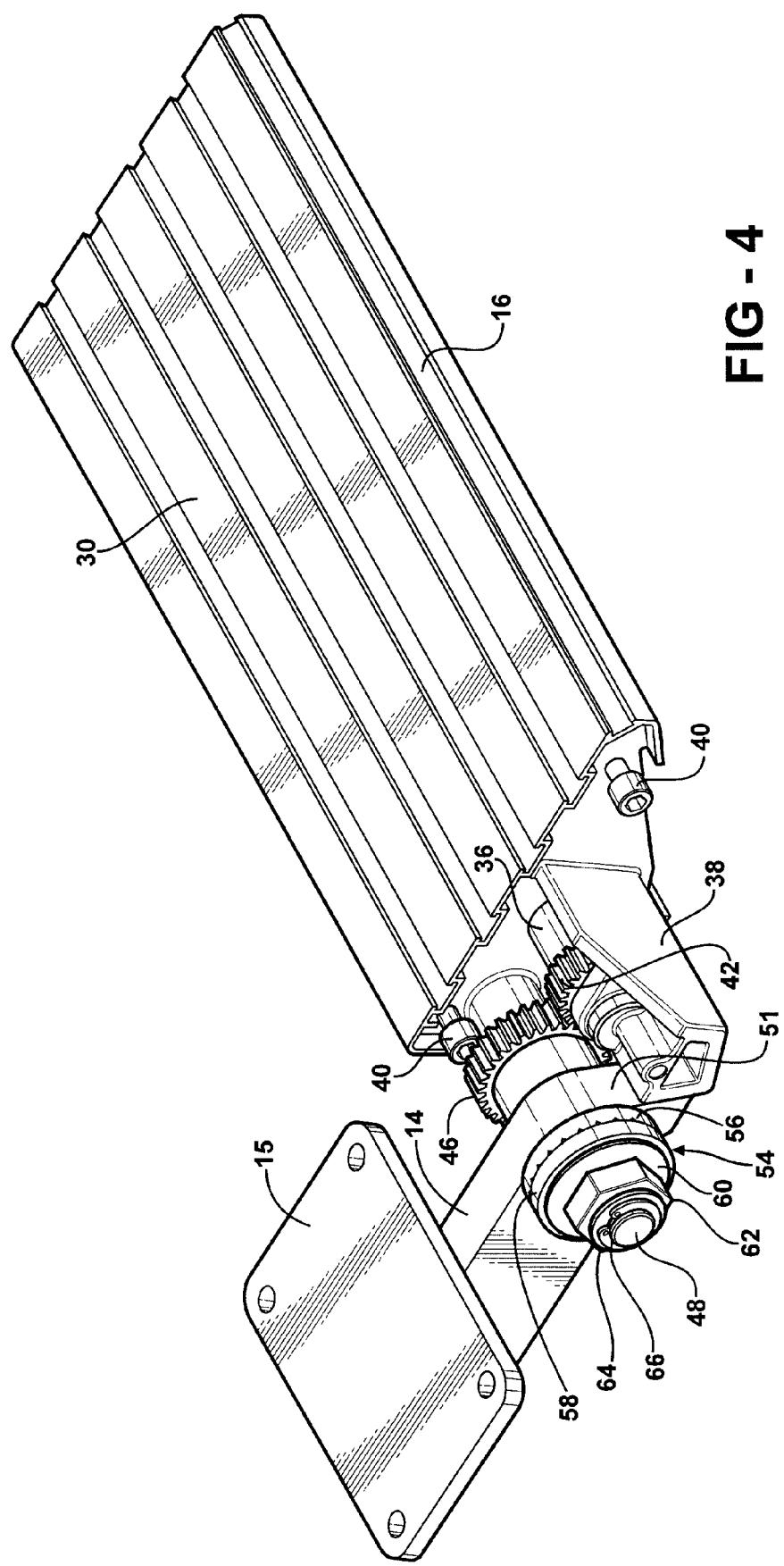
FIG. 4 is a perspective view of a rear end of the step including a rear end housing extending out therefrom for supporting a pinion shaft and a clutch assembly disposed along a rear pivot shaft.
Figure 7:
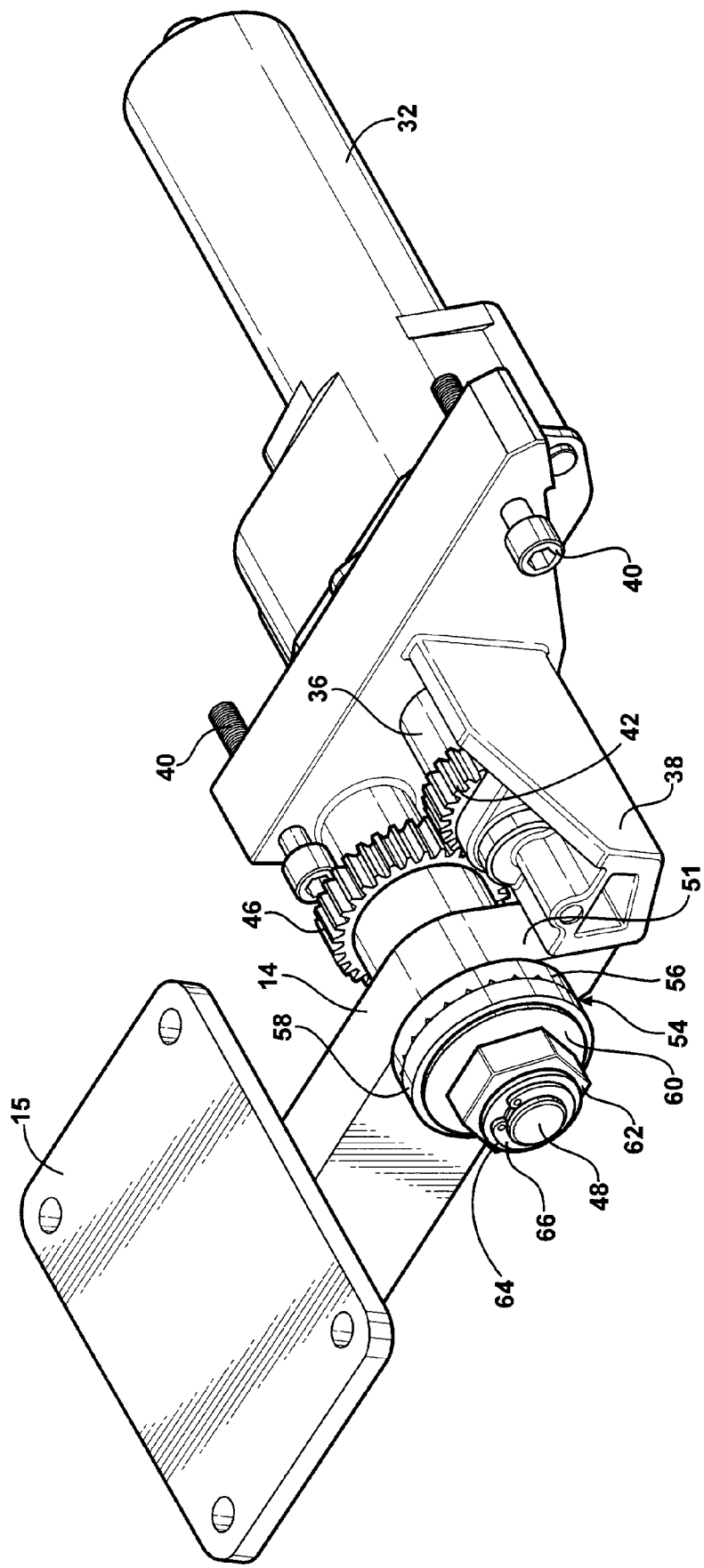
FIG. 7 is a perspective view of the motor, rear end housing, rear pivot shaft, and rear arm.
Figure 8:
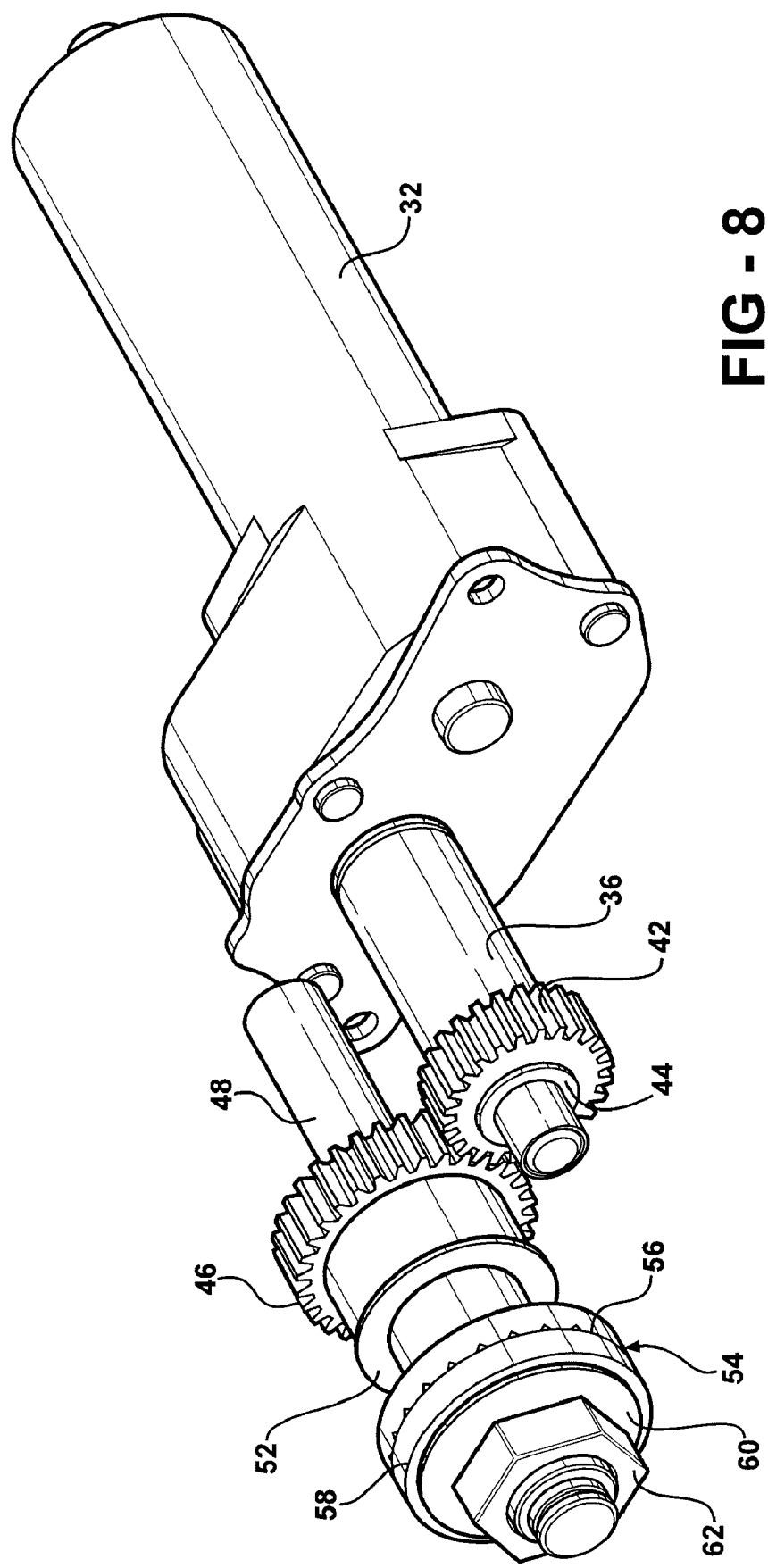
FIG. 8 is a perspective view of the motor, pinion shaft, rear pivot shaft, and clutch assembly.

A motor 32, shown in FIGS. 6 and 7, is disposed within the interior portion 21 of the step 16 adjacent the second end 20 of the main body portion 17. The step 16 includes a motor cover 34 for retaining the motor 32 in place within the interior portion 21. The motor 32 is operably coupled to the step 16 to move the step 16 between a deployed position, shown in FIG. 2, and a stowed position, shown in FIG. 3. It is appreciated that the step 16 may be integrated into a rocker panel of the motor vehicle such that the step 16, while in the stowed position, is flush with the rocker panel to create a seamless appearance along a side of the motor vehicle and the step 16, while in the deployed position is pivoted away from the rocker panel to support individuals entering or exiting the motor vehicle.

Referring to FIGS. 4 through 8, the motor 32 includes an output shaft (not shown) operably coupled to a pinion shaft 36. In one embodiment, the pinion shaft 36 extends out of the interior portion 21 of the step 16 and into the inner end cap 24. An end housing 38 is fixedly mounted to the step 16 by an end housing screw 40 and extends out from the step 16 to support the pinion shaft 36. A drive gear 42 is fixedly mounted along the pinion shaft 36 and a pinion shaft bearing 44 is mounted along the pinion shaft 36. The drive gear 42 is in meshing engagement with a driven gear 46. The driven gear 46 is fixedly mounted to a pivot shaft 48. Thus, rotation of the drive gear 42 will cause rotational movement of the pivot shaft 48 via the driven gear 46.

The pivot shaft 48 is also fixedly secured to the step 16. Therefore, rotational movement of the pivot shaft 48 will pivot the step 16 between the stowed and deployed positions. The pivot shaft 48 also extends through an opening 49 in a distal end 51 of the second arm 14. As such, the step 16 is operably coupled to the second arm 14. A pivot bearing 50 and a bearing 52 are also disposed along the pivot shaft 48.

A clutch assembly, generally indicated at 54, is provided to decouple the pivot shaft 48 from the motor 32 to allow manual movement of the step 16 between the stowed position and the deployed position. The clutch assembly 54 includes an arm clutch plate 56, a gear clutch plate 58, a clutch spring 60, and a spring nut 62. A pivot washer 64 and a lock ring 66 are located adjacent the clutch assembly 54.

It is appreciated that the motor 32 and the drive components (the pinion shaft 36, the drive gear 42, the driven gear 46, and the pivot shaft 48) are all located within the interior portion 21 of the step 16 or within an interior portion 67 of at least one of the end caps 22, 23, 24, 26 of the step 16, thus reducing the overall packaging space of the running board assembly 10. Further packaging space can be saved by integrating the step 16 into the rocker panel such that the step 16 is flush with the rocker body surfaces while in the stowed position.

Figure 9:
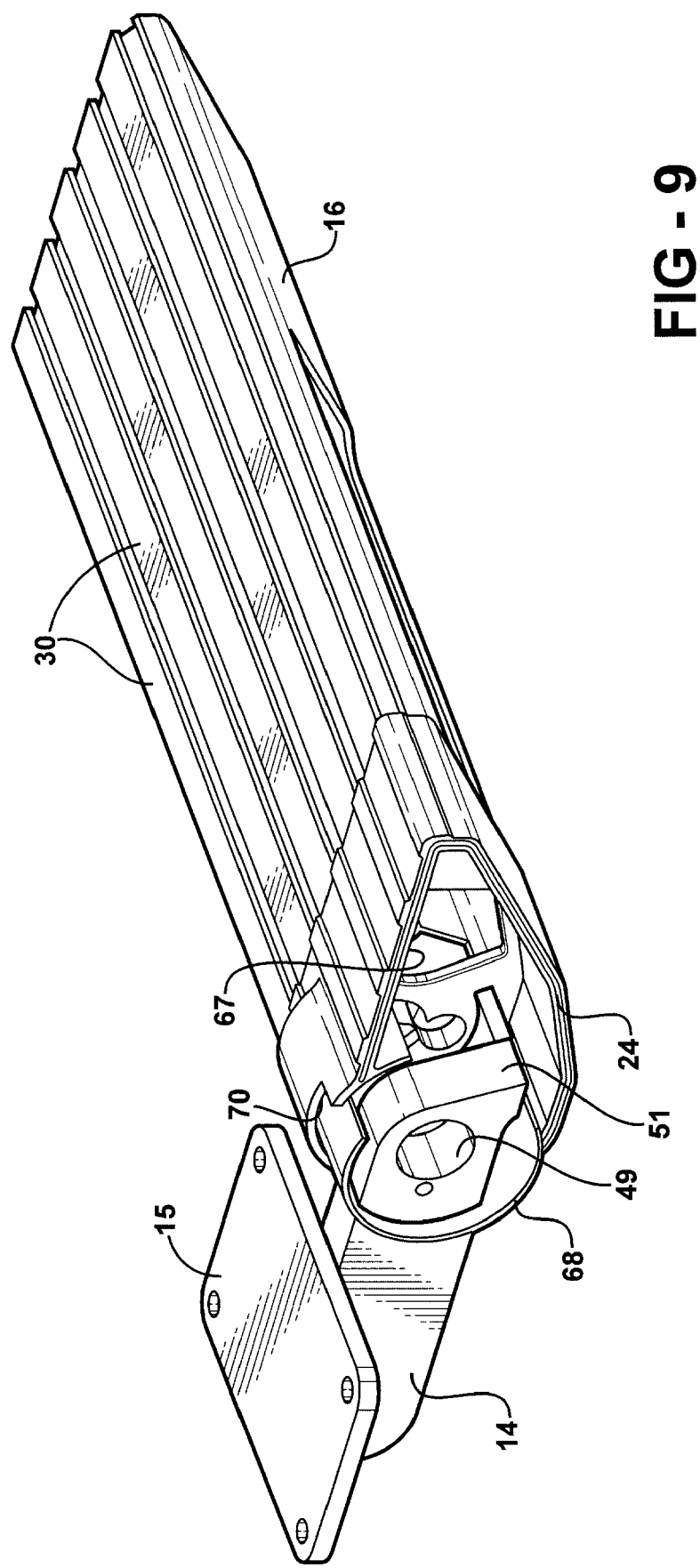
FIG. 9 is a fragmentary, perspective view including an inner rear end cap coupled to the step and a slot formed in the inner rear end cap for receiving a rotary seal.
Figure 10:
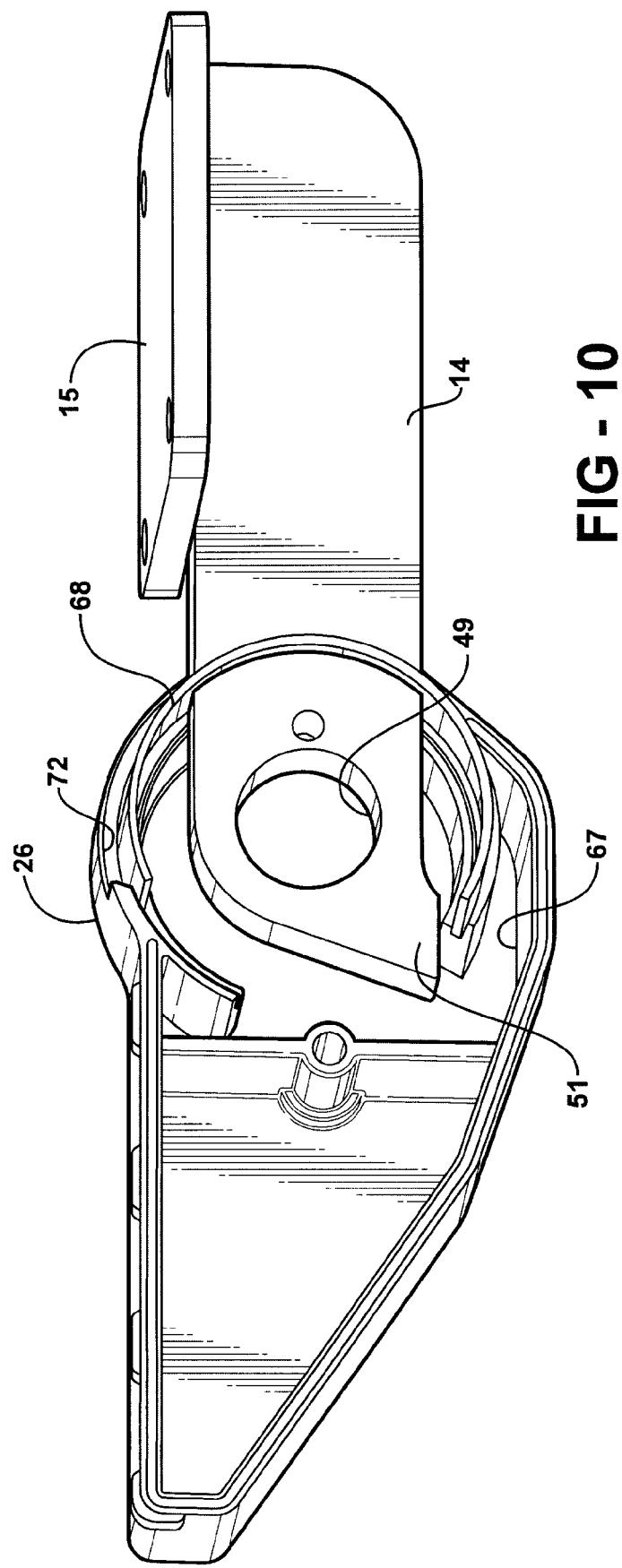
FIG. 10 is a perspective view of an outer rear end cap for receiving the rotary seal.

Referring to FIGS. 9 and 10, a rotary seal 68 is disposed within slots 70, 72 in the inner 24 and outer 26 end caps of the step 16 to seal out dirt, debris, and water from entering the interior portions 21, 67 of the step 16. The rotary seal 68 includes an opening receiving the second arm 14 therethrough. The rotary seal 68 moves within the slots 70, 72 as the step 16 moves between the stowed and deployed positions.

Figure 11:
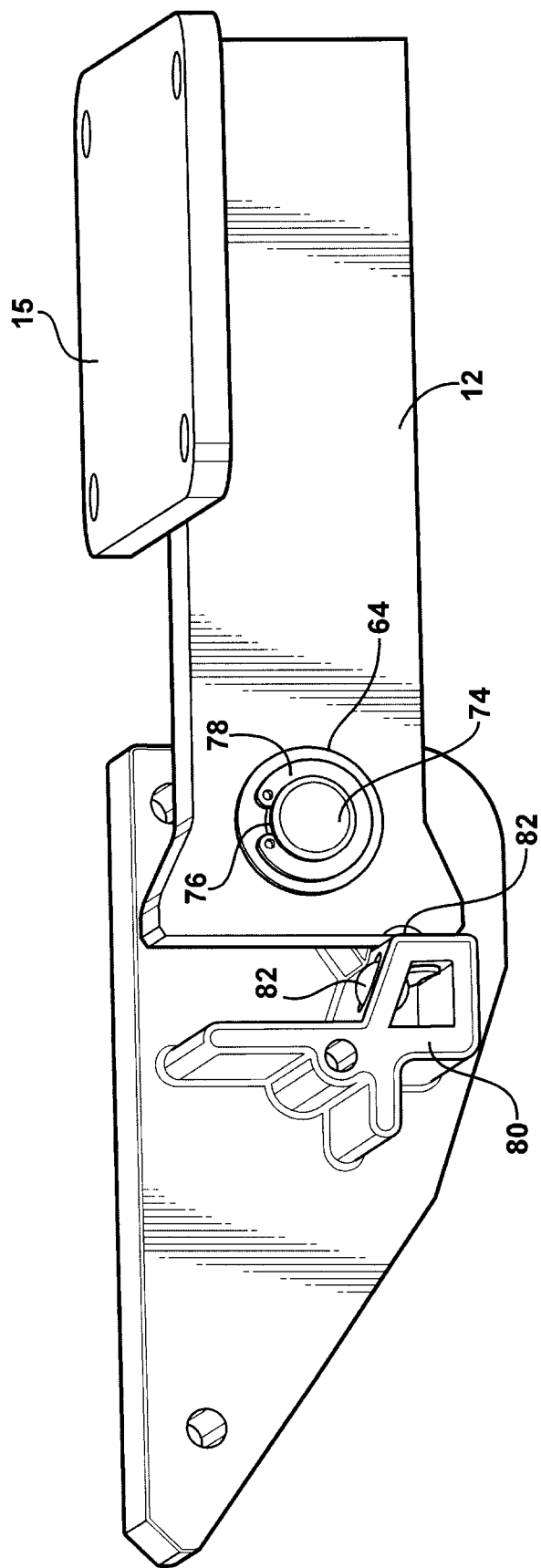
FIG. 11 is a perspective view of a front pivot shaft extending through a front arm and support by a front end housing.
Figure 12:
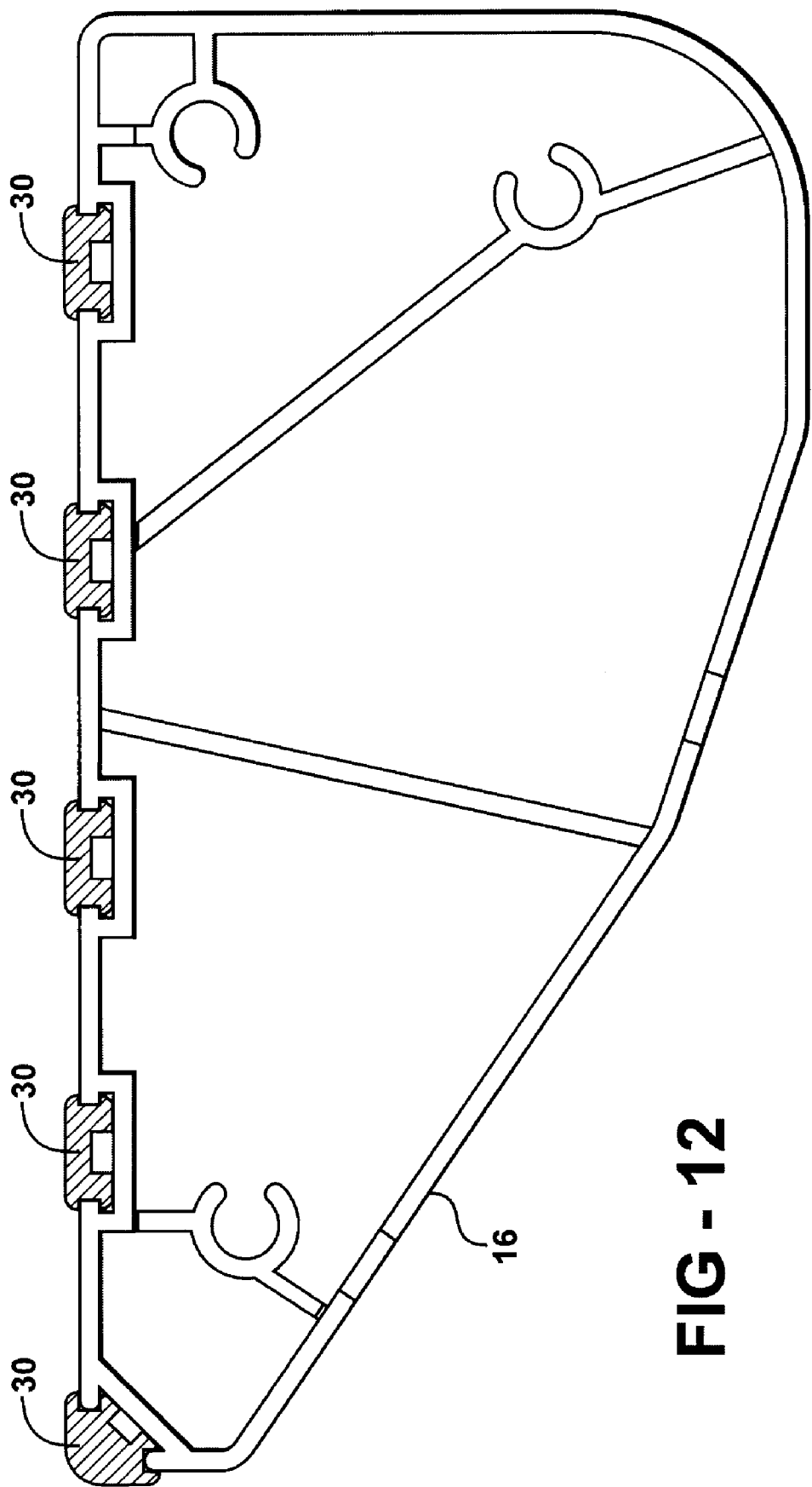
FIG. 12 is a sectional view of the step including a step thread disposed therealong.

Referring to FIG. 11, a pivot shaft 74 extends through the first arm 12 at one end thereof and is secured to the step 16. A pivot bearing 76 is disposed between the pivot shaft 74 and the first arm 12. A lock ring 78 extends around the pivot shaft 74 adjacent the first arm 12. An end housing 80 extends out from the step 16 to support the pivot shaft 74. The end housing 80 includes a plurality of stop bumpers 82 to limit movement of the step 16 in either of the stowed and deployed positions.

Figure 3:
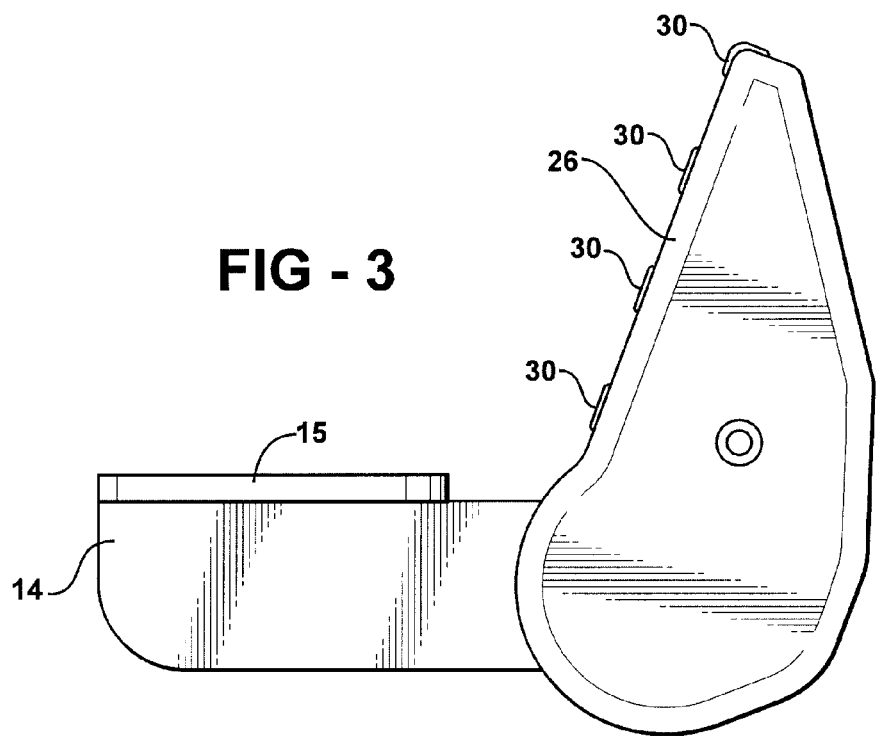
FIG. 3 is an end view of the running board assembly including the step in a stowed position.

In operation, starting with the step 16 in the stowed position, as shown in FIG. 3, the motor 32 is activated to rotate the pinion shaft 36 in a first direction. The rotation of the pinion shaft 36 causes meshing engagement between the drive 42 and driven 46 gears. As a result, the pivot shaft 48 rotates in a first direction relative to the rear arm 14. Since the pivot shaft 48 is fixedly secured to the step 16, the step 16 moves with the pivot shaft 48 into the deployed position. This movement causes the pivot shaft 74 to rotate relative to the first arm 12 to complete the pivotal movement of the step 16 into the deployed position.

To move the step 16 back to the stowed position, the motor 32 is activated to rotate the pinion shaft 36 in an opposing second direction. The rotation of the pinion shaft 36 causes meshing engagement between the drive 32 and driven 46 gears. As a result, the pivot shaft 48 rotates in a second direction relative to the second arm 14. Since the pivot shaft 48 is fixedly secured to the step 16, the step 16 moves with the pivot shaft 48 into the stowed position. This movement causes the pivot shaft 74 to rotate relative to the first arm 12 to complete the pivotal movement of the step 16 into the stowed position.

Finally, it is appreciated that the above-described invention may be modified to include a smooth belt connected between two smooth pulleys with a spring-biased tensioning device to provide a predetermined tension on the belt to allow slip between the belt and pulleys.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A running board assembly for a motor vehicle, said running board assembly comprising:
   an arm adapted to be fixedly coupled to the motor vehicle;
   a pivot shaft extending through one end of said arm and rotatable relative thereto;
   a step fixedly secured to said pivot shaft and movable therewith between a stowed position and a deployed position, said step defining an interior portion; and
   a motor disposed within said interior portion of said step and operably coupled to said pivot shaft such that actuation of said motor rotates said pivot shaft relative to said arm to move said step between said stowed position and said deployed position.

2. A running board assembly as set forth in claim 1 including a pinion shaft operably coupled to said motor and rotatable in response to actuation thereof.

3. A running board assembly as set forth in claim 2 including a drive gear fixedly secured to said pinion shaft for rotation therewith.

4. A running board assembly as set forth in claim 3 including a driven gear in meshing engagement with said drive gear and fixedly mounted along said pivot shaft to provide pivotal movement of said pivot shaft in response to actuation of said motor.

5. A running board assembly as set forth in claim 4 including an end housing fixedly secured to said step for supporting said pinion shaft.

6. A running board assembly as set forth in claim 5 wherein said arm includes a distal end having an opening extending therethrough for receiving said pivot shaft.

7. A running board assembly as set forth in claim 6 including a clutch assembly for selectively decoupling said pivot shaft from said motor to allow manual movement of said step between said stowed and deployed positions.

8. A running board assembly as set forth in claim 7 wherein said step includes a main body portion and an inner end cap fixedly secured to one end of said main body portion.

9. A running board assembly as set forth in claim 8 wherein said inner end cap includes an interior portion receiving said pinion shaft, drive gear, and driven gear therewithin.

10. A running board assembly as set forth in claim 9 including an outer end cap fixedly secured to said inner end cap opposite said main body portion.

11. A running board assembly as set forth in claim 10 wherein said step includes a slot formed therethrough.

12. A running board assembly as set forth in claim 11 including a rotary seal disposed within said slot to prevent dirt and moisture from entering said interior portion of said step.

13. A running board assembly for a motor vehicle, said running board assembly including:
   a mounting bracket adapted to be fixedly secured to the motor vehicle;
   an arm fixedly secured to said mounting bracket and having a distal end spaced apart from said mounting bracket, said distal end including an opening extending therethrough;
   a pivot shaft extending through said opening in said distal end of said arm and rotatable relative thereto;
   a step fixedly secured to said pivot shaft and movable between a stowed position and a deployed position; and
   a motor operably coupled to said pivot shaft such that actuation of said motor rotates said pivot shaft relative to said arm to move said step between said stowed position and said deployed position, wherein said motor moves with said step between said stowed position and said deployed position.

14. A running board assembly as set forth in claim 13 wherein said step defines an interior portion receiving said motor therewithin.

15. A running board assembly as set forth in claim 14 including a pinion shaft operably coupled to said motor and rotatable in response to actuation thereof.

16. A running board assembly as set forth in claim 15 including a drive gear fixedly secured to said pinion shaft for rotation therewith.

17. A running board assembly as set forth in claim 16 including a driven gear in meshing engagement with said drive gear and fixedly mounted along said pivot shaft to provide pivotal movement of said pivot shaft in response to actuation of said motor.

18. A running board assembly as set forth in claim 17 including a clutch assembly for selectively decoupling said pivot shaft from said motor to allow manual movement of said step between said stowed and deployed positions.

19. A running board assembly for a motor vehicle, said running board assembly comprising:
an arm adapted to be fixedly coupled to the motor vehicle;
a pivot shaft extending through said arm and rotatable relative thereto;
a step fixedly secured to said pivot shaft and movable between a stowed position and a deployed position, said step including a slot formed therethrough for receiving said arm therethrough;
a rotary seal disposed within said slot to prevent dirt and moisture from entering an interior portion of said step; and
a motor operably coupled to said pivot shaft such that actuation of said motor rotates said pivot shaft relative to said arm to move said step between said stowed position and said deployed position.

20. A running board assembly as set forth in claim 19 including a driven gear fixedly mounted along said pivot shaft.

21. A running board assembly as set forth in claim 20 including a drive gear operably coupled to said motor and engaging said driven gear to rotate said driven gear in response to actuation of said motor.

22. A running board assembly as set forth in claim 21 wherein said arm includes a distal end having an opening extending therethrough for receiving said pivot shaft.

23. A running board assembly as set forth in claim 22 wherein said motor is disposed within said interior portion of said step.

* * * * *